O. OEHRING.
ROLLER CONVEYING DEVICE FOR STRIPS OF MATERIAL.
APPLICATION FILED NOV. 17, 1909.
953,918.
Patented Apr. 5, 1910.
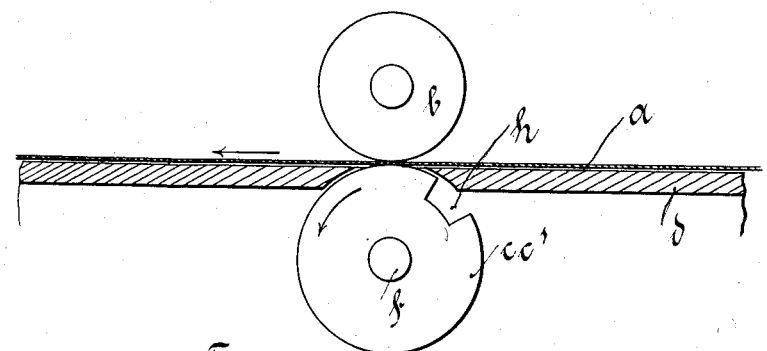
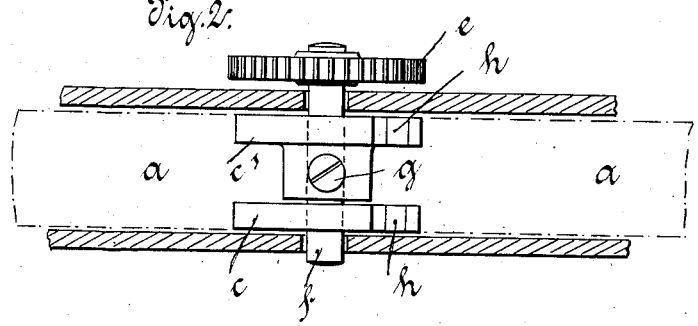
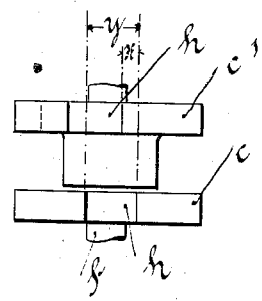
Witnesses:
Henry Harper
Inventor:

UNITED STATES PATENT OFFICE.

OSCAR OEHRING, OF BERLIN, GERMANY, ASSIGNOR TO AMERICAN STAMP AND TICKET VENDING MACHINE COMPANY, OF NEW YORK, N. Y.

ROLLER CONVEYING DEVICE FOR STRIPS OF MATERIAL.

953,918.  Specification of Letters Patent.  Patented Apr. 5, 1910.

Application filed November 17, 1909. Serial No. 528,632.

*To all whom it may concern:*

Be it known that I, OSCAR OEHRING, manager, a subject of the German Emperor, residing at Berlin, German Empire, have invented certain new and useful Improvements in Roller Conveying Devices for Strips of Material, of which the following is a specification.

This invention relates to a roller conveying device for cuttings from material in the form of strips, such as postage stamps, railway, or tram tickets, receipts and the like.

When cuttings of different lengths had to be conveyed in the same apparatus in the known roller conveying devices, it was necessary that the conveying rollers intended for the one length should be removed from the apparatus and be replaced by others, the circumferences of which corresponded to the length of strip to be moved forward by a single revolution. Consequently a large number of conveying rollers of different diameters had to be provided for one apparatus, one being used at a time.

According to the present invention the conveying of different lengths is always effected by the same pair of rollers, this being made possible by the circumference of the conveying roller being adjustable to the length to be conveyed. For this purpose the conveying roller is composed of two disks which can be adjusted in relation to one another from outside and are provided on the edge with a recess so that the remaining effective circumference of each disk corresponds to the smallest length to be conveyed. By rotating the two disks one against the other in such a manner that the recesses in each disk are not opposite one another, the conveying length corresponding to one revolution of the two conveying disks, can be varied from the smallest measure which in fact corresponds to the effective surface of the one disk, to the largest measure, which corresponds to the complete circumference of the disk, so that by means of the same conveying roller cuttings of different lengths can be conveyed without difficulty.

One form of the invention is illustrated by way of example in the accompanying drawing. Figure 1 being a front elevation, Fig. 2 a plan indicating the position corresponding to the conveying of the smallest cut. Fig. 3 is a diagram illustrating the variability of the conveying length.

The material $a$ to be conveyed and which is in the form of a strip is moved along the support $d$ by the conveying rollers $b$ $c$ $c'$. The upper roller $b$ is spring seated in the known manner and serves for pressing the strip to be forwarded against the actual conveying roller $c$ which is actuated in the known manner by the spur wheel $e$ connected with the driving gear.

In accordance with the invention the conveying roller $c$ consists of two disks of equal diameter arranged on the shaft $f$ one of which disks is firmly connected with the shaft $f$ while the other $c'$ is seated on the shaft so that it can be adjusted as desired by means of an adjusting screw $g$ or the like. Both the disks $c$ $c'$ are provided on the edge with a recess $h$ the length of which corresponds to the difference between the largest and the smallest length of strip to be conveyed at one revolution. The largest cut or length to be conveyed by one revolution of the shaft $f$ is evidently determined by the complete ideal circumference, the smallest by the effective circumference, of the conveying disks, that is after deduction of the length of the recess $h$. If now for example the smallest length of strip is to be conveyed, the two disks $c$ $c'$ are so adjusted in relation to one another, that the two recesses $h$ come opposite one another, Fig. 1. If a longer piece is to be conveyed the adjusting screw $g$ is loosened and the disk $c'$ rotated opposite the disk $c$ so far that the full edge of the former comes opposite the recess in the latter and to such an extent as the length to be conveyed exceeds the smallest length. See $x$ Fig. 3. The adjustment to the distance $y$ that is to say to the length of the recess in the disk, would correspond to the maximum increase in the conveying length. It will be seen that in consequence of this arrangement the effective conveying circumference of the conveying rollers can be varied and adjusted downward and upward within a certain limit as desired correspondingly to the different lengths of the cuts.

This conveying device can of course be employed in all possible kinds of apparatus for delivering, printing, perforating, separating etc. material in the form of strips, and be combined if necessary in the known manner with other conveying devices, for example a conveying device acting through prongs or the like.

What I claim is:

1. In a conveying device of the character disclosed, the combination with a shaft, of article-conveying means mounted thereon and comprising a pair of spaced integral disks, separately mounted on the shaft and having portions of their article-engaging peripheries cut away, one of said disks being fixed to the shaft, the other being rotatable on the said shaft to bring its cut away portion into more or less overlapping relation with the cut-away portion of the fixed disk, and means for securing the rotatable disk to the shaft independently of the fixed disk and thereby holding it against rotation on said shaft in its adjusted positions.

2. In a conveying device of the character disclosed, the combination with an article-supporting table, of a pressure roller located thereover, a shaft disposed beneath the roller, a disk fixed to the shaft and extending through the table, the periphery of said disk coöperating with the pressure roller to move an article and having a portion of its periphery cut away, another disk rotatably mounted on the shaft and extending through the table, the periphery of the latter disk coöperating with the pressure roller and having a portion cut away, and a device for securing the latter disk against rotation and in different positions on the shaft with its cut-away portion in more or less overlapping relation to the cut-away portion of the first mentioned disk.

In testimony whereof I have affixed my signature in presence of two witnesses.

OSCAR OEHRING.

Witnesses:
 HENRY HASPER,
 WOLDEMAR HAUPT.